No. 766,869. PATENTED AUG. 9, 1904.
L. BORSUM.
PHOTOGRAPHIC PLATE HOLDER.
APPLICATION FILED DEC. 18, 1903.
NO MODEL. 5 SHEETS—SHEET 1.
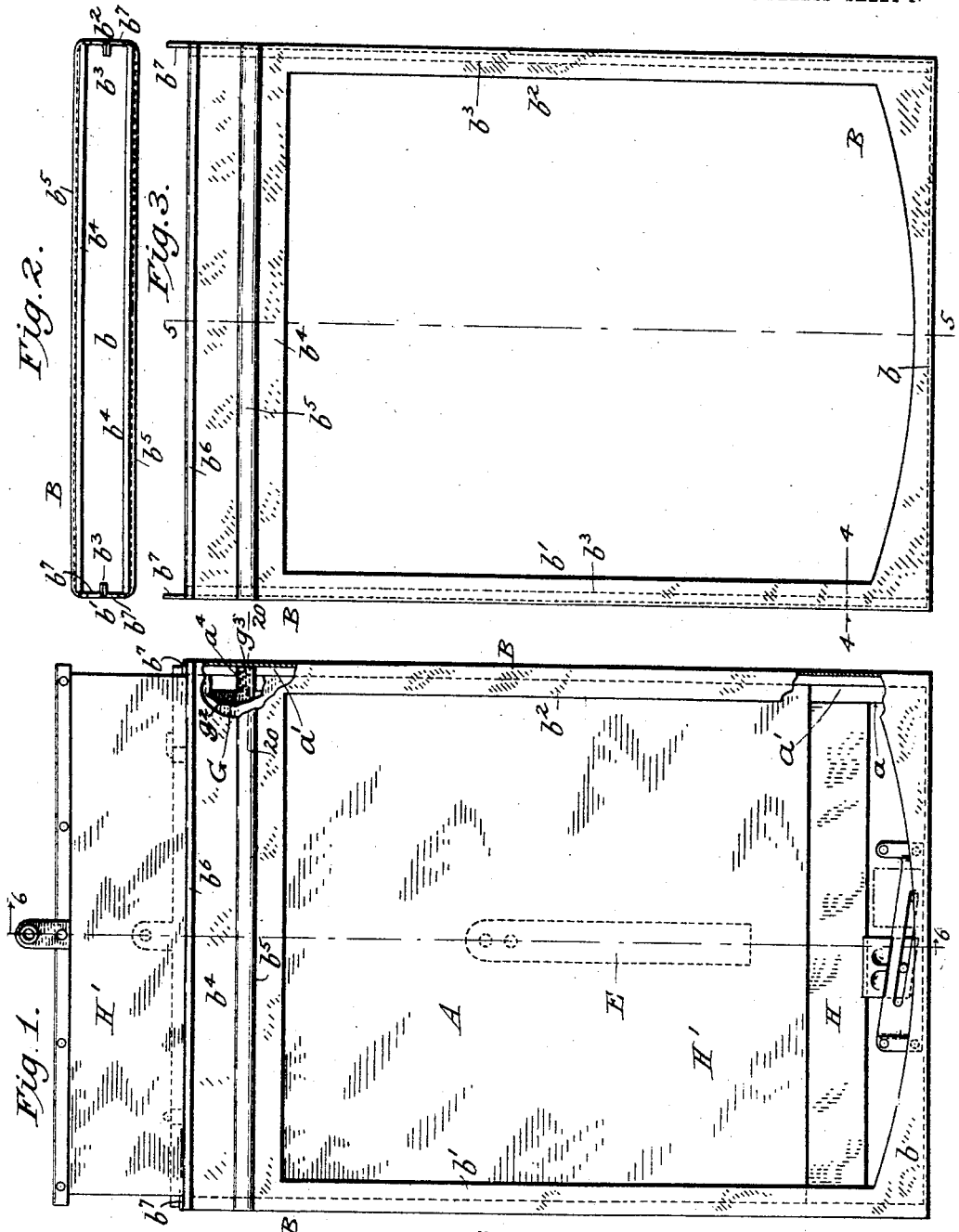
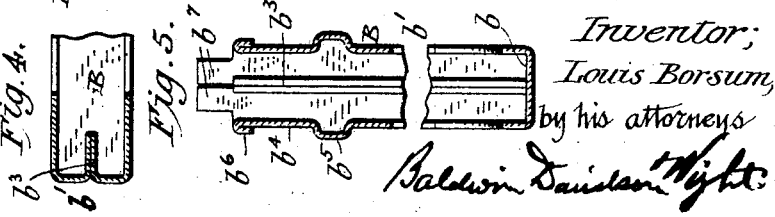
Witnesses: Inventor:
Louis Borsum,
by his attorneys
Baldwin Davidson Wight

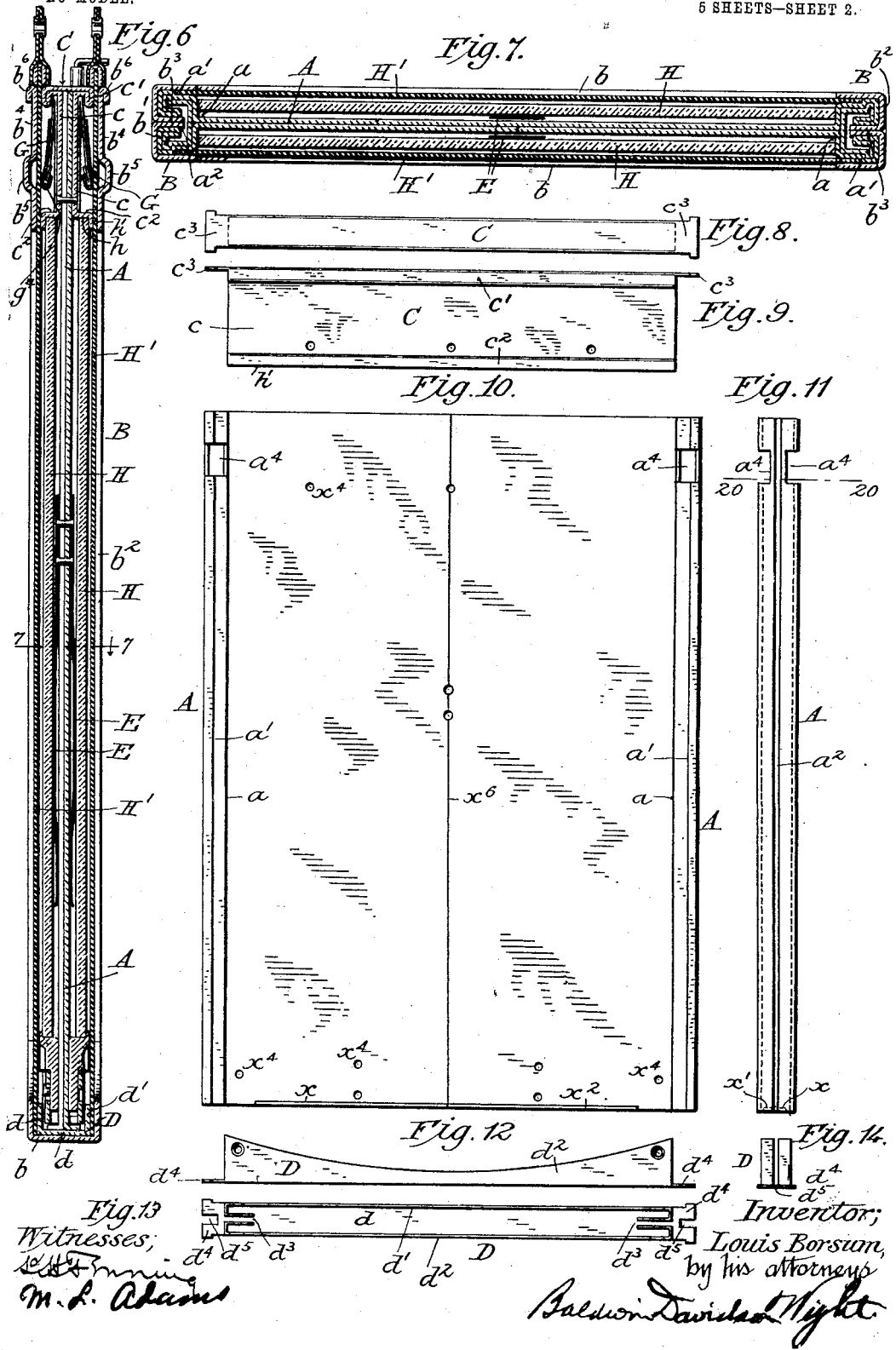

No. 766,869. PATENTED AUG. 9, 1904.
L. BORSUM.
PHOTOGRAPHIC PLATE HOLDER.
APPLICATION FILED DEC. 18, 1903.
NO MODEL. 5 SHEETS—SHEET 3.
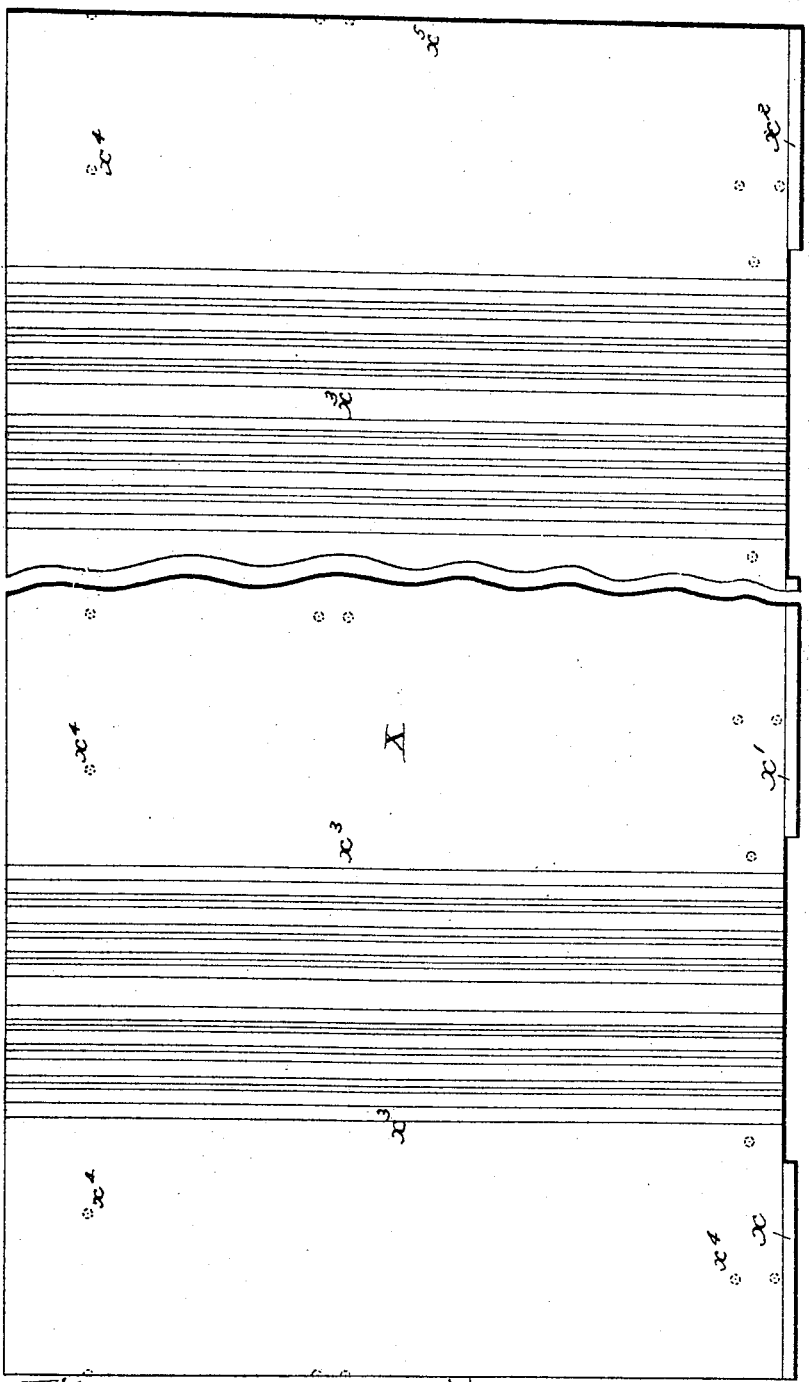
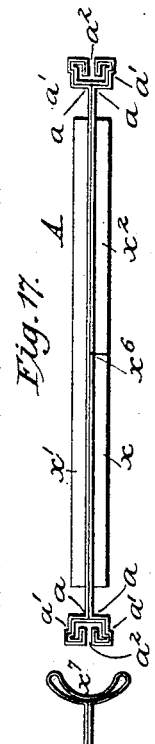
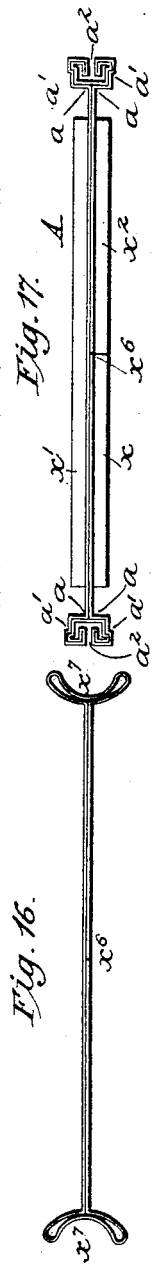
Witnesses:
Inventor:
Louis Borsum,
by his attorneys
Baldwin Davidson Wight No. 766,869. PATENTED AUG. 9, 1904.
L. BORSUM.
PHOTOGRAPHIC PLATE HOLDER.
APPLICATION FILED DEC. 18, 1903.
NO MODEL. 5 SHEETS—SHEET 4.
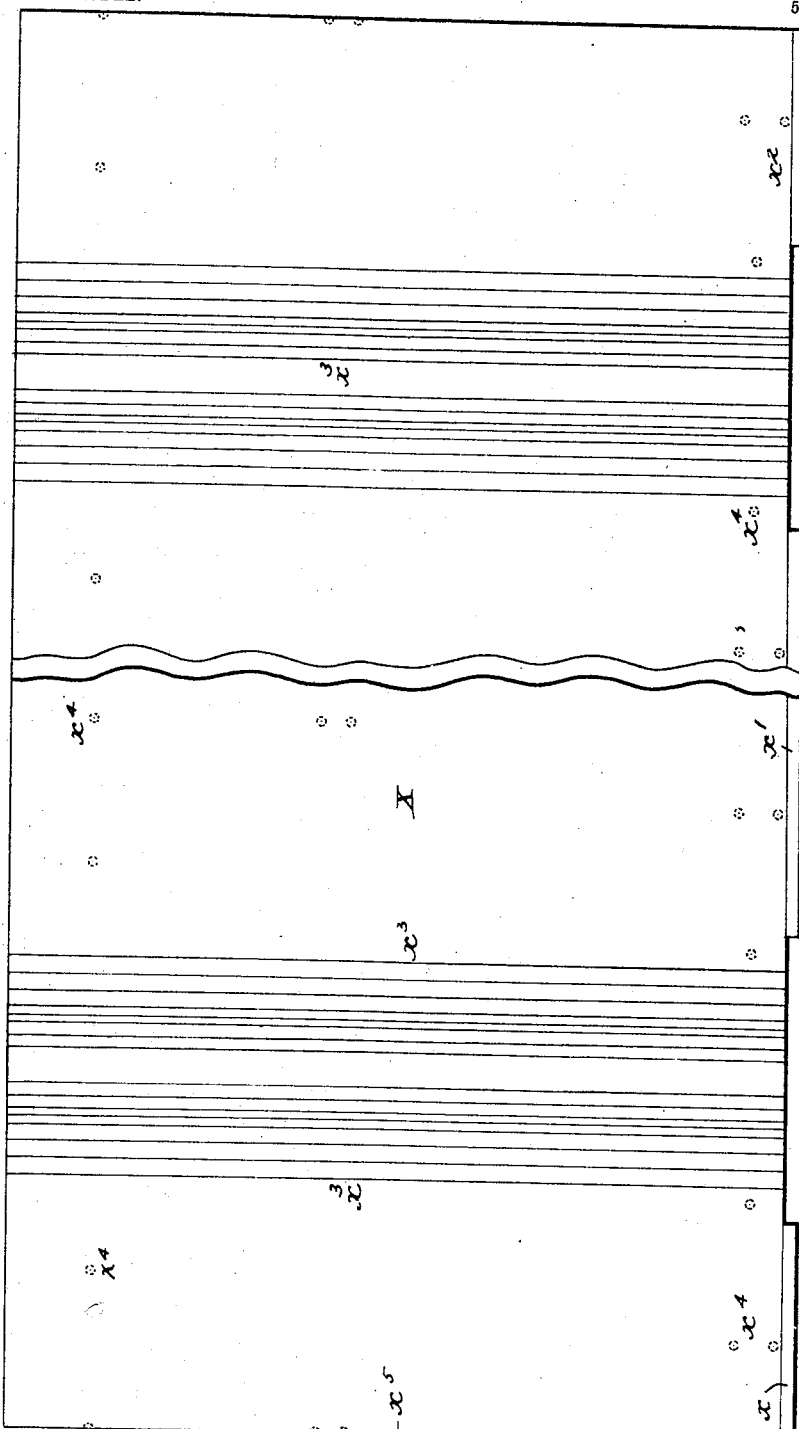
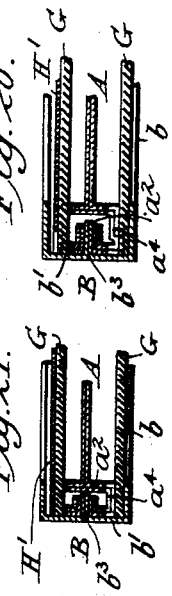
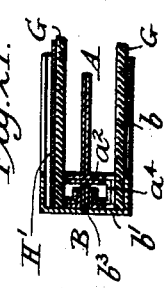
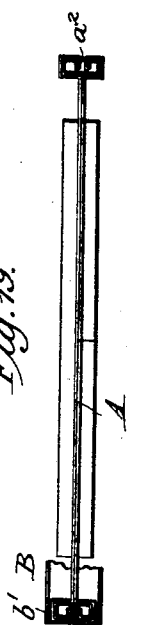
Inventor:
Louis Borsum,
by his attorneys No. 766,869. PATENTED AUG. 9, 1904.
L. BORSUM.
PHOTOGRAPHIC PLATE HOLDER.
APPLICATION FILED DEC. 18, 1903.
NO MODEL.
5 SHEETS—SHEET 5.
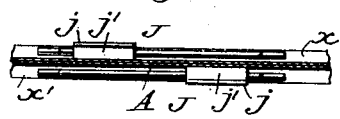
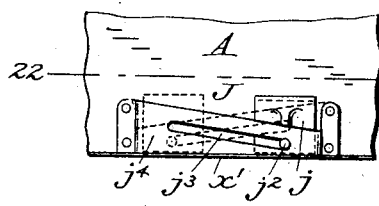
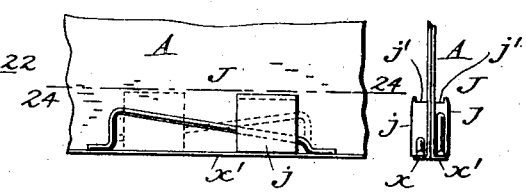
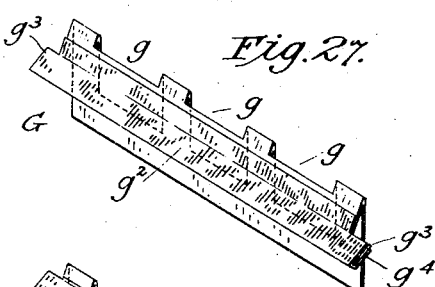
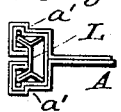
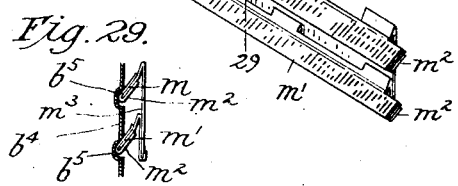
Witnesses;
Inventor;
Louis Borsum,
by his attorneys
Baldwin Davidson Wight.

No. 766,869.

Patented August 9, 1904.

UNITED STATES PATENT OFFICE.

LOUIS BORSUM, OF PLAINFIELD, NEW JERSEY.

PHOTOGRAPHIC-PLATE HOLDER.

SPECIFICATION forming part of Letters Patent No. 766,869, dated August 9, 1904.

Application filed December 18, 1903. Serial No. 185,729. (No model.)

*To all whom it may concern:*

Be it known that I, LOUIS BORSUM, a citizen of the United States, residing at Plainfield, in the county of Union and State of New Jersey, have invented certain new and useful Improvements in Photographic-Plate Holders, of which the following is a specification.

The object of my invention is to provide a plate-holder for photographic cameras which while being compact, light, and easily constructed shall be strong, rigid, and durable. Plate-holders as generally constructed are composed largely of wood; but according to my invention I construct the holder entirely of metal.

In carrying out my invention I form the plate-holder in two main parts—an inner frame and an outer frame. The inner frame is preferably made of a single piece of sheet metal bent into shape to form a central web or septum of double thickness and having its opposite longitudinal edges shaped to form grooves to receive corresponding ribs or flanges on the outer casing. This inner casing is enlarged along its longitudinal edges to provide recesses on opposite sides of the partition or septum to receive the photographic plates. Preferably caps of special construction are employed to secure the folds of the inner frame together at opposite ends. These caps are made to interlock with the inner frame, and the outer one of these caps is recessed to receive light-guards of improved construction. The outer frame is preferably made of a single piece of sheet metal, having on the inside of the top and bottom rails ribs or flanges which fit the grooves on the inner frame, the construction being such that the outer frame may slide over the inner frame when the parts are being assembled, and thus the two frames are locked together. At one end the outer frame is formed with recesses or grooves to receive the outer ends of the light-guards when the slides or shutters are removed. Each light-guard is formed from a piece of sheet metal, having a portion which is received by a recess in the outer end cap or binding-piece of the inner frame and another portion which carries a strip of soft opaque material, such as velvet, and which is adapted to bear against the slide when the latter is inserted or to enter a recess or groove in the outer frame when the slide is withdrawn. The holder is also provided with locks for the plates. These are of improved construction, being attached to the web or septum of the inner frame at its inner end, and comprise a block, adapted to engage the inner end of the plate, mounted to slide obliqely in suitable guides, whereby when the block is moved transversely of the frame it is also caused to move longitudinally thereof, and thus firmly engage the plate.

My improvements are illustrated in the accompanying drawings, in which—

Figure 1 shows a front elevation of a plate-holder embodying my improvements. Some parts of the frames are broken away in order to better illustrate other parts. Fig. 2 shows an end view of the outer frame. Fig. 3 shows a front view thereof. Fig. 4 shows a local transverse section of the outer frame on the line 4 4 of Fig. 3. Fig. 5 shows a section of the outer frame on the line 5 5 of Fig. 3 with a part of the frame broken away. Fig. 6 shows a longitudinal central section of the holder, plates, and slides on the line 6 6 of Fig. 1. Fig. 7 shows a transverse section thereof on the line 7 7 of Fig. 6. Fig. 8 shows an end view of the outer cap which is employed to connect the folds of the inner frame at its outer end and which has recesses to accommodate the light-guards. Fig. 9 shows a front elevation of the cap shown in Fig. 8. Fig. 10 shows a front elevation of the inner frame as formed from a single piece of metal and before the end caps are applied. Fig. 11 shows a top or plan view of the frame shown in Fig. 10. Figs. 12, 13, and 14 are views of the cap which is applied to the inner end of the inner frame. Fig. 15 is a view of the blank or templet from which the inner frame is made, a portion of the blank being broken away. Fig. 16 illustrates the manner in which the blank is first bent in order to form a double thickness for the web or septum and curved top and bottom portions of double thickness, which are subsequently bent to form recesses for the plates and slides and guides to receive the outer frame. Fig. 17 is an end view of the inner frame when bent to the form illustrated in Fig. 10. Fig. 18 shows a modified form of blank for the inner frame. Fig. 19 shows how the blank shown in Fig. 18 is bent to form the inner frame, and this figure also shows a portion of the outer frame and illustrates the manner in which the inner and outer frames are connected. Fig. 20 is a sectional view on the line 20 20 of Figs. 1 and 11. Fig. 21 is a sectional view similar to Fig. 20, but with the inner frame modified in the manner shown in Fig. 19. Figs. 22 and 23 are detail views of the plate-lock which I preferably employ, Fig. 22 being a section on the line 22 22 of Fig. 23. Figs. 24, 25, and 26 are detail views of a modified form of plate-lock, Fig. 24 being a section on the line 24 24 of Fig. 25. Fig. 27 is a perspective view of one of my improved light-guards. Fig. 28 is a perspective view of a modification thereof. Fig. 29 shows a section on the line 29 29 of Fig. 28. Fig. 30 is a detail view in section of a device for locking the slides in the holder. Figs. 31 and 32 show further modifications of the inner frame.

My improved plate-holder consists mainly of two parts—an inner frame A and an outer frame B. Each of these frames is made of a single piece of sheet metal, preferably aluminium, in order to secure minimum weight. The outer frame B has no auxiliary parts for the purpose of holding it in shape; but the inner frame has caps C and D at opposite ends for this purpose.

In constructing the inner frame I preferably start with a blank X, such as illustrated in Fig. 15. As will be observed, this blank is rectangular in general outline except that it has at one end flanges $x$ $x'$ $x^2$ and is marked or scored with transverse lines at $x^3$ to indicate the lines of bending at the top and bottom portions of the frame. The blank may also be formed with holes $x^4$ to receive rivets, if these are employed. First the blank is bent into the shape indicated in Fig. 16, where it will be observed that the opposite ends $x^5$ of the blank are brought together at $x^6$, and then portions of the blanks containing the scores or marks $x^3$ are bent so as to form large top and bottom portions $x^7$, each of double thickness and curved in opposite directions. After having been bent to this shape the portions $x^7$ are bent to the shape indicated in Fig. 17. In this figure the flanges $x$ $x'$ $x^2$ are shown as being bent to assume positions at right angles to the body of the blank, and the top and bottom portions of the blank have portions $a$ on opposite sides to receive the photographic plates and shoulders $a'$, forming guides for the slides. These top and bottom portions are also formed with grooves $a^2$ to receive the inwardly-projecting ribs or flanges on the outer frame in the manner hereinafter described. When bent to the form shown in Fig. 17, the main body portion of the inner frame is complete. I then form recesses $a^4$ in the enlarged top and bottom portions of the frame to receive portions of the light-guards, hereinafter referred to.

The web or septum may be secured together by rivets, if desired; but I preferably secure the parts together at their inner ends by means of a cap D of the form shown in Figs. 12, 13, and 14. This cap has a closed inner end $d$, from which project front and back pieces $d'$ $d^2$. The ends of the cap have parallel inwardly-projecting flanges $d^3$, and from the ends the rear piece $d$ is prolonged to form ears $d^4$, which are slotted at $d^5$. This cap may be fitted over the inner end of the inner frame, the flanges $x$ $x'$ $x^2$ entering between the front and back parts $d'$ $d^2$ and the flanges $d^3$ overlapping the web or septum, while the recesses $d^5$ in the ears $d^4$ receive the ribs or flanges on the outer frame in the manner hereinafter explained.

Preferably the cap D is riveted to the inner frame; but this is done after the plate-locking devices are attached. The opposite or outer end of the inner frame receives the cap C. (Shown particularly in Figs. 8 and 9.) This cap has two parallel body portions $c$, which are spaced apart sufficiently to allow them to receive between them the outer end of the web or septum of the inner frame, and each of these portions $c$ is formed with an overhanging flange $c'$ at its outer end and a shoulder $c^2$ at its inner end. These flanges and shoulders are so arranged as to form recesses to receive the light-guards, hereinafter described. Ears $c^3$ are formed at the outer end of the cap, on opposite sides thereof, which overlap the enlarged portions at the top and bottom of the inner frame. When the cap C is applied to the inner frame, it is preferably riveted thereto in the manner indicated in Fig. 6. When the inner frame thus has the caps C and D applied, it is complete except for the application of the usual springs E (shown in Fig. 6) and the plate-locking devices, which will be hereinafter fully described.

The outer frame is clearly shown in Figs. 2 and 3 and somewhat more in detail in Figs. 4 and 5. It is made from a single piece of sheet metal. Its inner portion $b$ is closed at its inner end at top and bottom and on opposite sides. Its top and bottom portions $b'$ $b^2$ are trough-like and have inwardly-projecting ribs or flanges $b^3$. At its outer end the inner frame has cross-pieces $b^4$ on opposite sides, and each of these cross-pieces is formed with a groove or recess $b^5$, extending from top to bottom of the frame and adapted to receive the outer or free ends of the light-guards when the slides are withdrawn from the holder. Preferably the extreme outer edges of the frame B are turned over and pressed down at $b^6$ in order to avoid sharp edges. The ears $b^7$ (shown as projecting outwardly in Fig. 3) may be turned down upon the outer end of the inner frame when the parts are assembled. Fig. 2 shows a view of the outer end of the inner frame. This end is open and adapted to receive the inner frame, which latter is slid into the outer frame, the flanges or ribs $b^3$ entering the grooves $a^2$. When the flanges thus enter the grooves, the former are held close together, so that the two parts of the outer frame are prevented from spreading. No other devices need be employed for holding the outer frame in shape. After the inner and outer frames have been thus united, the ears $b^7$ may be turned over upon the outer end of the inner frame, and thereafter the two frames are prevented from sliding the one upon the other.

The light-guards G are shown mounted in Fig. 6, and they are shown separately in Figs. 27, 28, and 29. In Fig. 6 I have shown light-guards constructed like that shown in Fig. 27, where the guard is shown as consisting of a piece of sheet metal having portions punched out at $g$ to afford lightness and also to afford sufficient elasticity to cause the guards to press with a yielding pressure on the slides and also to enter the recesses $b^5$ in the outer frame B when the slides are removed. One portion of the metal frame is adapted to be arranged vertically to fit into a recess behind the overhanging flange $c'$ in the cap C and to lie close against the shoulder $c^2$. The other portion $g^2$ of the frame has laterally-projecting ears $g^3$, and this portion of the guard-frame is covered by opaque material, such as velvet, $g^4$. The slides H' may be of any usual construction. They are shown in position in Fig. 6, and as will be there seen the light-guards bear against them. If the slides are withdrawn, the light-guards will spring outward and enter the recesses $b^5$. The ears $g^3$ of the light-guards are adapted to enter the recesses $a^4$ when the slides are inserted and the light-guards are compressed in the manner indicated in Fig. 6. The slides are adapted to slide in ways formed between the front and rear portions of the outer frame and the front and rear faces of the inner frame. The longitudinal edges of the slides bear against the shoulders $a'$, as indicated in Fig. 7. The slides extend all the way to the inner end of the frames, their extreme inner ends being arranged to slide between the portions $d'$ $d^2$ of the inner cap D and the inner portion of the outer frame.

The plates H are shown in position in Figs. 6 and 7, their outer ends being received in the recesses $h$, formed by the turned-over inner edges $h'$ of the cap C, which form the shoulders $c^2$. The opposite or inner ends of the plates H are received by the locking devices J, which are of novel construction. As shown in Figs. 1, 6, 22, and 23, each of these locking devices consists of a block $j$, having a seat $j'$ for the edge of the glass or plate and carrying a laterally-projecting pin $j^2$, which enters an oblique slot $j^3$ in a bridge-piece $j^4$, secured to the inner frame A at its inner end. The construction is such that if the block $j$ be moved transversely of the frame—i. e., up or down—it will also move horizontally or in a direction toward the opposite end of the holder, the effect being to cause the block to grasp the plate and securely hold it in place. When the block is at the lower end of the slot, one end of the plate may be inserted into the recess $h$ of the cap C, and then the block may be slid toward the opposite end of the bridge-piece and caused to engage the adjacent edge of the plate, so as to securely hold it in place. In the modification shown in Fig. 24 instead of employing a bridge-piece with an oblique slot I employ a wire arranged obliquely and passing through an oblique slot in the block.

The effect is the same, as will be obvious from an inspection of Fig. 25.

Fig. 30 shows a device commonly used for locking the slides in the frame.

In Fig. 31 I have shown a portion of the inner frame with its top and bottom enlarged portions slightly modified and provided with a reinforcing-piece L. Fig. 32 merely shows a side view of the enlarged portion of the inner frame shown in Fig. 31.

In Figs. 28 and 29 I have shown a modified form of light-guard. In this instance each light-guard has two portions $m$ $m'$, carrying opaque material $m^2$. The metallic portion $m^3$ of this light-guard has one part formed similar to that shown in Fig. 27; but the opposite or inner end of this metallic frame $m^3$ is prolonged, turned inwardly and then outwardly to form the portion $m'$. This supplemental portion may be made in one piece with the other portion of the frame, or it may be separately attached thereto. When each light-guard has two light-excluding parts, the outer frame should be formed with two corresponding grooves or recesses $b^5$, as illustrated in Fig. 29. The light-guard shown in Fig. 29 may be placed in position in the cap C in the same manner as that shown in Fig. 6.

While I prefer to construct the several parts in the manner before described, the same effect may be obtained by various modifications. For instance, in Figs. 18 and 19 I have shown a modified way of forming the inner frame. In this instance the shoulder $a'$ is omitted and the slides may be made to extend and bear against the outer frame, if desired. Further modifications of the specific constructions of the two frames are illustrated in Figs. 20 and 21.

I have shown and described the holder as adapted to receive two plates; but it may be formed to receive one plate only.

I claim as my invention—

1. A photographic-plate holder, comprising an inner frame having reinforced opposite edges, an outer frame adapted to fit over the inner frame and having a sliding tongue-and-groove connection with the inner frame, said frames when assembled having one or more recesses and guides for the photographic plates and slides.

2. A photographic-plate holder, comprising an inner frame formed with a septum or partition with reinforced grooved edges and having plate-holding portions on opposite sides of the septum, and an outer frame formed with flanges or ribs engaging the grooves of the reinforced portions of the septum and having recesses to receive the slides.

3. A photographic-plate holder, comprising an inner frame made of sheet metal doubled upon itself and having enlarged grooved top and bottom portions, an outer frame made from a single piece of sheet metal adapted to inclose the edges of the inner frame and having inwardly-projecting ribs or flanges entering the grooves of the inner frame, said frames being provided with recesses between them to receive photographic plates and slides, substantially as described.

4. A photographic-plate holder, comprising an inner frame formed from a single piece of sheet metal doubled upon itself having enlarged top and bottom portions formed with grooves, a cap for the inner end of the inner frame which interlocks therewith, a cap for the outer end of the inner frame formed with recesses to receive light-guards and an outer frame having ribs or flanges engaging the grooves of the inner frame and formed with recesses for the free ends of the light-guards.

5. In a photographic-plate holder, the combination with a frame adapted to receive a photographic plate, of a plate-lock comprising an obliquely-moving block adapted to engage one edge of the plate and connected with an oblique guide.

6. In a photographic-plate holder, the combination of a frame for holding a photographic plate, of a block adapted to engage one edge of the plate, a bridge-piece having an inclined slot and a pin on the block which enters said slot.

7. In a photographic-plate holder, the combination of a plate-holding frame and a light-guard comprising a sheet-metal frame having a bent-over portion carrying a light-excluding material and formed with laterally-projecting ears for the purpose specified.

8. In a photographic-plate holder, the combination of a frame for holding one or more plates, a cap or outer frame-piece formed with a shoulder and with an overhanging flange and a light-guard comprising a frame-piece adapted to extend beneath the overhanging flange and to rest against the shoulder and having a free portion carrying light-excluding material.

9. In a photographic-plate holder, the combination of a frame adapted to support a plate and having a recessed portion for a light-guard, of a light-guard mounted in said recessed portion comprising a sheet-metal frame having portions cut out to attain resiliency and lightness in the frame and having a free portion carrying a light-excluding material.

10. In a photographic-plate holder, the combination of a plate-holding frame, and a light-guard comprising a sheet-metal frame, having portions cut from it, and formed at opposite ends with laterally-projecting resilient portions carrying light-excluding material.

In testimony whereof I have hereunto subscribed my name.

LOUIS BORSUM.

Witnesses:
   KATHARINE MacMAHON,
   WILLIAM A. STAHLIN.